UNITED STATES PATENT OFFICE.

GEORGE A. ESCH, OF SANDUSKY, OHIO.

PLASTERING COMPOSITION AND METHOD OF MAKING SAME.

SPECIFICATION forming part of Letters Patent No. 627,910, dated June 27, 1899.

Application filed February 20, 1899. Serial No. 706,164. (No specimens.)

*To all whom it may concern:*

Be it known that I, GEORGE A. ESCH, a citizen of the United States, residing at Sandusky, in the county of Erie and State of Ohio, have invented certain new and useful Improvements in Plastering Compositions and in the Methods of Making the Same, of which the following is a full, clear, and exact description.

My invention relates to a compound used in making what is known as a "hard finish" for walls, ceilings, and the like, more particularly known as a "white-finish" coat, although it is obvious the compound may be used with various tinting or coloring agents.

The object of the invention more especially is to retard the setting of the coat and give opportunity to the plasterer to smooth and neatly finish the surface.

In carrying out my invention I take gypsum, in bulk, and unslaked lime, also in bulk, and put these substances in what is technically termed a "cracker" or mill, by the action of which they are reduced to small lumps, after which operation they are thrown together into a mill, preferably of the bur-stone type, and reduced to a powder of the nature of flour. The powder thus formed is next placed while dry in a kettle or receptacle, to which heat is applied, the temperature being raised above the boiling-point of water, whereupon the greater part of the moisture eliminated from the gypsum, which is considerable, is absorbed by the lime, the result being the slaking of the latter. This operation results in the calcination of the gypsum and the slaking of the lime. The proportions of gypsum and unslaked lime thus ground and treated together may be stated as six thousand two hundred pounds of gypsum to eighteen hundred and fifty pounds of lime, their mixture in these quantities having been found to produce good results. I do not, however, limit myself to exact proportions. The grinding and reduction to a powder of the gypsum and unslaked lime together effect an intimate combination of the two substances.

Heretofore where the lime has been slaked separately from the gypsum there have been left unslaked small lumps of lime, resulting, when the compound has been used in the plastering operation, in the production of cracks and other defects in the surface. These defects, as has been demonstrated, are avoided in the use of my compound, this desirable result being due to the intimate combination effected between the gypsum and the lime and the perfect slaking of the latter by the moisture eliminated from the gypsum during the heating process. A portion of this moisture, of which the gypsum contains a considerable quantity, will pass off into the atmosphere during the heating process, but the greater portion will be absorbed by the lime effecting the slaking.

During the heating or boiling, hereinbefore described, glue and borax previously dissolved in water may be poured into the kettle or heater, the proportions for the amount of gypsum and lime specified being about fifteen and six-tenths pounds of glue and eighteen and three-fourths ounces of borax, only sufficient water having been used to dissolve these ingredients. After the addition of the dissolved glue and borax the boiling or heating of the entire compound or mixture is continued for a short time, after which the receptacle or kettle is emptied of its contents, which on cooling become a hard-finish compound in the form of powder.

In using this compound sufficient water is added to form it into a paste or putty, in which condition it is ready to be applied to walls, ceilings, or the like in the same manner as the old-style lime-and-plaster finish has been used, and when so applied it makes a hard smooth finish coat, commonly known as a "hard finish." As above stated, it is preferably used as a white-finish coat, but is capable of being suitably tinted to produce other effects.

Having thus described my invention, I claim—

1. The herein-described plastering composition, consisting of gypsum, lime, glue and borax, the proportions being substantially as specified, and treated and combined as set forth.

2. The herein-described plastering composition, consisting of gypsum, six thousand two hundred pounds; lime, eighteen hundred and fifty pounds; glue, fifteen and six-tenths pounds, and borax, eighteen and three-fourths ounces, all treated and combined substantially as specified.

3. The method herein described of making a plastering composition for hard finish, the same consisting in reducing to powder together gypsum and unslaked lime, and applying heat to and boiling the mixture, the moisture inherent in the gypsum effecting the slaking of the lime during the heating process, substantially as set forth.

4. The method herein described of making a plastering composition for hard finish, the same consisting in reducing to powder together gypsum and unslaked lime in substantially the proportions specified, and applying heat to and boiling the mixture, the moisture in the gypsum effecting the slaking of the lime during the heating process, substantially as set forth.

5. The method herein described of making a plastering composition for hard finish, the same consisting in reducing to powder together gypsum and unslaked lime, applying heat to and boiling the mixture, the moisture in the gypsum effecting the slaking of the lime during the heating process, and adding, during the boiling, glue and borax dissolved in water, and in proportions, substantially as set forth.

In testimony whereof I hereunto set my hand and seal.

GEORGE A. ESCH. [L. S.]

Witnesses:
 THOMAS M. SLOANE,
 FRANK G. SLOANE.